United States Patent [19]

Dufour et al.

[11] Patent Number: 4,460,741

[45] Date of Patent: Jul. 17, 1984

[54] POLYBLENDS OF THERMOPLASTIC COPOLYETHERESTERS, STYRENE-MALEIC ANHYDRIDE POLYMERS, ACRYLONITRILE-BUTADIENE-STYRENE POLYMERS, AND NITRILE RUBBERS

[75] Inventors: Daniel L. Dufour; James S. Holtrop, both of Longmeadow, Mass.

[73] Assignee: Monsanto Company, St. Louis, Mo.

[21] Appl. No.: 439,089

[22] Filed: Nov. 4, 1982

[51] Int. Cl.³ ............... C08L 25/14; C08L 55/02; C08L 25/08; C08L 25/12

[52] U.S. Cl. .................................. 525/64; 525/166; 525/173; 525/207

[58] Field of Search ............... 525/64, 166, 173, 175, 525/176, 207

[56]  References Cited

U.S. PATENT DOCUMENTS

| | | | |
|---|---|---|---|
| 3,641,212 | 2/1972 | Narayana | 525/207 |
| 3,718,715 | 2/1973 | Crawford et al. | 260/873 |
| 3,963,801 | 6/1976 | Su | 260/873 |
| 4,124,653 | 11/1978 | Whitlock | 260/873 |
| 4,126,602 | 11/1978 | Salee | 260/40 |
| 4,197,376 | 4/1980 | Lee | 525/74 |
| 4,234,701 | 11/1980 | Abolins | 525/68 |
| 4,305,869 | 12/1981 | Lee | 525/74 |
| 4,337,192 | 6/1982 | Campbell | 523/212 |
| 4,346,195 | 8/1982 | Hornbaker | 525/176 |

FOREIGN PATENT DOCUMENTS 53-00252  1/1978  Japan ................ 525/64

Primary Examiner—John C. Bleutge
Assistant Examiner—Patricia Short
Attorney, Agent, or Firm—Linda L. Lewis; William J. Farrington; Paul D. Matukaitis

[57] ABSTRACT

Molding compositions are prepared from blends of (A) a thermoplastic copolyetherester elastomer; (B) a styrene maleic anhydride polymer; (C) an ABS or MBS polymer; and (D) a nitrile rubber. Component B, the styrene maleic anhydride polymer may optionally contain a termonomer such as methyl-methacrylate or acrylonitrile and a rubber component.

15 Claims, No Drawings

POLYBLENDS OF THERMOPLASTIC COPOLYETHERESTERS, STYRENE-MALEIC ANHYDRIDE POLYMERS, ACRYLONITRILE-BUTADIENE-STYRENE POLYMERS, AND NITRILE RUBBERS

BACKGROUND OF THE INVENTION

This invention relates to polyblends and specifically to polyblends of styrene-maleic anhydride (SMA) polymers and acrylonitrile-butadiene-styrene (ABS) polymers with certain thermoplastic copolyetheresters and nitrile rubbers capable of conferring on the SMA polymers and blends thereof with ABS improved impact properties, particularly low temperature impact.

SMA polymers of the type described herein and blends of the SMA polymers with ABS polymers are useful as molding and extrusion compounds. Certain end-use applications require impact strengths above those obtained with SMA polymers and blends thereof with ABS. Examples of such applications include the dashboard and instrument panels in automobiles, appliance housings and smaller molded parts for various uses. Other properties of the molded objects, such as Vicat softening temperature and tensile strength, should be maintained within useful ranges.

The present invention provides a means of improving the impact properties of SMA polymers and blends thereof with ABS while maintaining other physical properties within useful ranges.

DESCRIPTION OF THE PRIOR ART

Polyblends of SMA and ABS type polymers are described in U.S. Pat. Nos. 4,197,376 and 4,305,869. Polyblends of SMA, ABS and PVC are described in U.S. Pat. Nos. 4,311,806 and 4,329,272. Blends of SMA type polymers and aromatic polyesters are described in U.S. Pat. No. 4,126,602. Blends of SMA type polymers and nitrile rubbers are described in U.S. Pat. No. 3,641,212. Copolyetherester elastomers are described in U.S. Pat. Nos. 3,023,192, 3,651,014, 3,766,146, 3,775,373, 3,784,520 and 3,891,604.

SUMMARY OF THE INVENTION

The present invention provides a polyblend comprising:

A. from 3 to 20% by weight of a thermoplastic copolyetherester elastomer;

B. from 15 to 75% by weight of a polymer of vinylaromatic monomer (e.g. styrene) and an unsaturated dicarboxylic acid anhydride monomer (e.g. maleic anhydride) and optionally a termonomer, preferably one selected from the group consisting of $C_1$ to $C_3$ acrylates and methacrylates and unsaturated nitriles, wherein the relative amounts by weight of the monomers in the polymer are 50 to 85% of the vinylaromatic monomer, 15 to 35% of the dicarboxylic acid anhydride and 0 to 20% of the termonomer; and wherein the monomers are polymerized in the presence of 0 to 35% by weight of a rubber having a glass transition temperature below 0° C.; and C. from 12 to 60% by weight of a grafted composition comprising a graft polymer of from 20 to 40 parts by weight of a monomer selected from the group consisting of acrylonitrile and methyl methacrylate and 80 to 60 parts by weight of a vinyl aromatic monomer the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition;

D. from 3 to 20% by weight of a nitrile rubber which is a copolymer of an unsaturated nitrile monomer (e.g. acrylonitrile) and a diene (e.g. butadiene) preferably having a nominal acrylonitrile level of 15 to 50% and a Mooney viscosity in the range from 30 to 95 cps; and wherein the weight percent for Components A, B, C and D is based on the total amount of Components (A), (B), (C), and (D) in the polyblend.

Thermoplastic copolyetherester elastomers which are suitable for use as Component A in the practice of the present invention are defined below. The term "thermoplastic copolyetherester elastomer" as used herein means a segmented polymer comprising about 30% to about 80% by weight of recurring linear etherester (soft) segments derived from difunctional polyether glycol and dicarboxylic acid and about 70% to about 20% by weight of recurring linear ester (hard) segments derived from organic diol and aromatic dicarboxylic acid. Polyether glycols having a number average molecular weight from about 350 to about 6000 are suitable with polyether glycols having a molecular weight between about 800 and 4000 being preferred. The aromatic ester hard segment represents a repeating unit of a fiber-forming polyester having a melting point above 150° C., preferably, above 200° in its fiber-forming molecular weight range, for example, polyethyleneterephthalate and polytetramethyleneterephthalate. For further details on the preparation, composition and properties of such segmented thermoplastic copolyetherester elastomers, see U.S. Pat. Nos. 3,023,192; 3,651,014; 3,766,146; 3,775,373; 3,784,520 and 3,891,604, all assigned to E. I. du Pont de Nemours and Company, the disclosures of which are hereby incorporated by reference. Suitable segmented thermoplastic copolyetherester elastomers derived from terephthalic acid, polytetramethylene ether glycol and 1,4-butanediol may be purchased from du Pont under the trademark HYTREL® elastomer.

Further information on HYTREL® elastomers is contained in *New Commercial Polymers*, 1969–1975, by Hans-Georg Elias, Midland Macromolecular Institute, Midland, Michigan 48640, translated from the German by Mary M. Exner; Gordon and Breach Science Publishers (New York, London and Paris) at Pages 85 to 89, and in "Polymerization Reaction & New Polymers, Segmented Polyester Thermoplastic Elastomers" by W. K. Witsiepe, published in *Polymerization Reactions & New Polymers* at pages 39 to 59, Amer. Chem. Soc.—Advances in Chemistry Series No. 129 (edited by N.J. Platzer) 1973, the disclosures of which are hereby incorporated herein by reference.

Component B of the above formulation is preferably a styrene-maleic anhydride polymer. The styrene may be replaced in whole or in part by other vinylaromatic monomers such as alpha-methyl styrene, chlorostyrene, bromo-styrene, p-methyl styrene and vinyl toluene. Similarly the maleic anhydride can be replaced in whole or in part by other unsaturated dicarboxylic anhydrides such as itaconic, aconitic or citraconic anhydride. Component B optionally contains a termonomer such as $C_1$ to $C_3$ alkyl acrylate or methacrylate, acrylonitrile or methacrylonitrile. The preferred termonomer, where present, is methyl methacrylate.

The proportions of the monomers preferably employed provide an anhydride content of from 15 to 30% by weight and a methyl methacrylate content of 5 to 15% by weight with the balance being styrene.

Component C is typically an ABS or MBS type polymer that is to say a diene rubber substrate grafted with styrene and either acrylonitrile, methyl methacrylate, methyl acrylate or a mixture of these monomers. However the rubber need not be the conventional polybutadiene or butadiene/styrene copolymer since any rubber with a glass transition temperature below 0° C. can be used. Such rubbers include those which may provide the substrate for rubber modified SMA polymers described below. The styrene may be replaced in whole or in part by other styrenic monomer such as described with reference to Component B above. The acrylonitrile may be replaced in whole or in part by methacrylonitrile.

Component C may be replaced in whole or in part by a rubber modified styrene-maleic anhydride polymer. Rubber modified SMA polymers are prepared by polymerizing monomers of the type and amounts used to prepare Component B above, e.g., styrene, maleic anhydride and optionally methyl methacrylate, in the presence of the rubber in such a way that the polymerizing monomers are grafted onto the rubber substrate and a matrix copolymer of essentially the same composition as the graft copolymer is simultaneously generated. Suitable methods of producing such rubber modified copolymers are well known in the art and a typical process is described in U.S. Pat. No. 3,919,354.

The rubber modified SMA polymer contains from 5 to 35% by weight of a rubber component and preferably from 10 to 25 percent by weight of such a rubber component. The rubber component is conventionally a diene rubber such as polybutadiene, polymers of butadiene with a comonomer such as styrene or acrylonitrile which contains at least 60% and preferably 80% by weight of butadiene or a butadiene based block or radialblock rubber. Other rubbers such as EPDM rubber, polypentenamer, polyisoprene, polychloroprene, polyacrylate rubbers and the like can, if desired, also be used.

Component D, the nitrile rubber component, is typically a copolymer of butadiene and acrylonitrile such as those available from B. F. Goodrich Company, Chemical Group, 6100 Oak Tree Blvd., Cleveland, Ohio 44131 under the designation Hycar. The nitrile rubber contains from 15 to 50% acrylonitrile with a specific gravity of from 0.90 to 1.10 and a Mooney viscosity of from 30 to 95 cps. The acrylonitrile can be replaced in whole or in part by other nitriles such as methacrylonitrile. Likewise the butadiene can be replaced in whole or in part by other diene monomers such as chloroprene or isoprene.

In addition to the above components the polyblends of the invention can advantageously contain other additives such as plasticizers, antioxidants, stabilizers, flame-retardants, fibers, minerals, dyes, pigments and the like.

The components of the polyblend can be blended together by any convenient process. Usually however they are extrusion blended or compounded in a high intensity blender such as a Banbury Mixer.

Components B and C can be together provided by the formulations described in U.S. Pat. Nos. 4,305,869 and 4,197,376 and then blended with Component A and D.

The invention is now described with reference to the following examples which are for the purpose of illustration only and are not intended to imply any limitation on the scope of the invention. The components described below are blended in a number of different ratios and tested for various properties.

COMPONENTS USED

ABS-1—prepared by the graft emulsion polymerization of styrene and acrylonitrile in a weight ratio of 70:30 in the presence of polybutadine. ABS-1 contains 40% by weight of polybutadiene. The weight average molecular weight of the free styrene/acrylonitrile polymer in the graft polymer is in the range from 200,000 to 400,000 as determined by gel permeation chromatography [GPC] using ASTM Method D 3536-76 modified in that 4 columns in series using micro Styragel (Waters Assoc.) packing are used with a nominal exclusion limit of 500A units, 1,000A units, 10,000A units. and 100,000A units. The detector is an ultra violet detector set at wavelength 254 nm. The test samples are prepared at a concentration of 0.25% weight of polymer in tetrahydrofuran. The sample injection size is 0.2 ml and a flow rate of 2 ml/min. at ambient temperature is or can be used.

The grafted polybutadiene has an average particle size in the range of from 0.1 to 0.25 micron measured as a weight average particle size diameter with centrifugal photosedimentometer (CPSM) by the published procedure of Graves, M. J. et al "*Size Analysis of Subsieve Powders Using a Centrifugal Photosedimentometer*", British Chemical Engineering 9:742-744 (1964). A Model 3000 Particle Size Analyzer from Martin Sweets Co., 3131 W. Market St., Louisville, KY can be used.

ABS-2—prepared by the graft suspension polymerization of styrene and acrylonitrile in a weight ratio of 72:28 in the presence of polybutadiene. ABS-2 contains 14% by weight of polybutadiene. The weight average molecular weight by GPC of the free styrene/acrylonitrile polymer in the graft polymer is in the range from 70,000 to 100,000 and the grafted polybutadiene has an average particle size in the range of from 0.6 to 1.6 microns by CPSM.

S/MA/MM—a terpolymer prepared by polymerizing a monomer mixture of styrene, maleic anhydride and methyl methacrylate to produce a composition in which the above monomers are in the weight ratio of 70:24:6 respectively.

TCPE—a thermoplastic copolyetherester elastomer which is a block copolymer of short-chain diol terephthalate and longchain polyether diol terephthalate available from DuPont Company, Elastomer Chemicals Department, Wilmington, DE 19898 under the designation HYTREL ® 4056. HYTREL ® 4056, which comprises about 42% by weight of hard segments of polybutylene terephthalate and about 58% by weight of soft segments of polytetramethylene ether terephthalate, has a Durometer hardness of 92A/40D; a melting point of 168° C.; a Vicat Softening Point of 112° C. and flexural modulus of 48.3 MPa.

NR-1—a copolymer of butadiene and acrylonitrile available from B. F. Goodrich Company, Chemical Group, 6100 Oak Tree Blvd., Cleveland, Ohio 44131, under the designation Hycar 1034-60. It contains about 21% acrylonitrile and about 79% butadiene. It has a specific gravity of 0.95 and an average Mooney viscosity of about 55. It has an antioxidant added for stability.

NR-2—a copolymer of butadiene and acrylonitrile available from B. F. Goodrich Company, Chemical Group, 6100 Oak Tree Blvd., Cleveland, Ohio 44131, under the designation Hycar 1094-80. It contains about 21% acrylonitrile and about 79butadiene. It has a specific gravity of 0.95 and an average Mooney viscosity of about 80. It has an antioxidant added for stability.

Glycolube TS—a glycerol tristearate plasticizer, available from Glyco.

Goodrite 3114—an alkylated phenol antioxidant available from Goodrich.

Carbon Black Masterbatch—⅜ by weight of almost pure carbon obtained by the incomplete combustion of hydrocarbon oils or gases or by cracking hydrocarbon gas under pressure. This material is available from Cities Service Company, Columbia Division under the designation Raven C. Black. It is thoroughly dispersed in ⅝ by weight SAN (31% AN and 69% styrene) polymer prior to blending.

Resin-Cure—a heat-reactive phenolic resin prepared from a methylol, alkyl-substitued phenol available from Schenectady Chemicals, Inc., Schenectady, New york 12301 under the designation SP 1045. SP 1045 has a melting point of 63° C. and a specific gravity of 1.05.

SAMPLE PREPARATION AND TEST METHODS

The components used in the working examples are compounded in a Banbury at 180° to 250° C. except that in examples 7 to 9 and 12 the components are compounded in an ABS extruder with a 6.35 cm screw at 240° to 260° C. The resulting blends are injection molded on an Arburg Molding Machine at 220° to 260° C. and 500 to 2000 psi. The molded samples are subjected to the following tests:

VICAT Softening Point (ASTM-D-1525-76-Rate B) a one (1) kg test using a heating rate of 120° C. per hour;

Izod Impact (ASTM D-256-56) with results given in Joules/meter (J/m);

Gardner Impact using a 2.54 mm thick sample, a 6.35 mm diameter dart and a 14.3 mm diameter ring with results given in Joules (J);

Viscosity—(ASTM-D-3835) using a temperature of 246° C. and a shear rate of 100 reciprocal seconds. The results are given in pascal seconds (Pa.s);

Tensile (ASTM-D-638) results given in megapascals (MPa);

Modulus (ASTM-D-638) result given in megapascals (MPa); and

Multiaxial Inverted Dart Impact (IDI) a modification of the test as described in Society of Plastics Engineers National Technical Conference "Plastics in Surface Transportation" Nov. 12-14, 1974 Detroit, Mich. pg. 238. In the modified test, instead of the dart being attached to the slider and striking the sample, the sample holder is attached to the slider and strikes the instrumented dart. The rotary potentiometer is not used. The instrumented dart used is 1.27 cm in diameter, and the sample strikes the instrumental dart at a velocity of 111.76 m/min. The samples are injection molded into 7.62 cm×10.16 cm×0.254 cm and then are cut into 3.81 cm×5.08 cm×0.254 cm pieces for testing.

The energy to maximum is the energy needed to achieve the yielding of a ductile sample. The energy to failure represents the energy necessary to cause a failure of a ductile sample. Room temperature is 22° C.±1° and 50%±1% relative humidity.

WORKING EXAMPLES AND TEST RESULTS

In Examples 1 to 12 various polyblends are prepared and tested and the results tabulated in Tables 1 to 4. Control Examples are identified as C-1 to C-10 and are included in Tables 1 to 4 for comparison purposes. All examples are prepared using 0.3% by weight Goodrite 3114 and 2.5% by weight Glycolube TS based on total weight of polymeric components (A), (B), (C) and (D). The amounts of the polymeric components (A), (B), (C) and (D) used are parts by weight and are calculated to add up to a 100 parts by weight total.

TABLE 1

| COMPONENTS | SUMMARY OF EXAMPLES 1 TO 3 AND C-1 to C-5 | | | | | | | |
|---|---|---|---|---|---|---|---|---|
|  | C-1 | 1 | 2 | C-2 | C-3 | 3 | C-4 | C-5 |
| SMAMM | 50 | 45 | 45 | 45 | 45 | 55 | 55 | 55 |
| ABS-1 | 33 | 35 | 29 | 30 | 30 | 23 | 23 | 23 |
| ABS-2 | 17 | — | 7 | 7 | 7 | 6 | 6 | 6 |
| NR-1 | — | 12 | 11 | 18 | — | 9 | 16 | — |
| TCPE | — | 8 | 8 | — | 18 | 7 | — | 16 |
| VICAT °C. | 131 | 131 | 129 | 130 | 134 | 136 | 135 | 138 |
| IZOD J/m NOTCH | 152 | 347 | 347 | 342 | 228 | 266 | 260 | 136 |
| VISCOSITY Pa.s | 1250 | 1740 | 1640 | 2000 | 910 | 1380 | 1780 | 790 |
| IDI AT ROOM TEMP. ENERGY | | | | | | | | |
| TO MAX. J | 5.8 | 10.9 | 11.6 | 10.5 | 10.9 | 10.4 | 10.1 | 9.3 |
| TO FAIL J | 6.0 | 14.9 | 15.4 | 12.9 | 14.9 | 12.2 | 11.1 | 10.9 |
| IDI AT −20° C. ENERGY | | | | | | | | |
| TO MAX. J | 3.6 | 11.6 | 11.4 | 10 | 9.9 | 8.6 | 6.2 | 6.7 |
| TO FAIL J | 3.7 | 13.1 | 12.5 | 10.6 | 10.9 | 8.9 | 6.3 | 6.9 |
| TENSILE STRENGTH | | | | | | | | |
| YIELD MPa | 32 | 28.6 | 28.7 | 26 | 33.3 | 33.1 | 29.4 | 36.7 |
| FAIL MPa | 29.6 | 24.2 | 24.7 | 22.1 | 29.2 | 27.9 | 25 | 30.6 |
| % ELONGATION YIELD | 2.01 | 2.78 | 2.71 | 2.48 | 2.78 | 2.58 | 2.38 | 2.34 |
| % ELONGATION FAIL | 27 | 23.9 | 9 | 19 | 26.3 | 24.7 | 13.9 | 26.1 |
| MODULUS MPa | 2170 | 1470 | 1455 | 1407 | 1565 | 1710 | 166 | |

In Table I, a comparsion of Example 1 and Control C-1 shows the dramatic increase in Izod and IDI impact that is achieved over the SMA/ABS polyblends of the prior art. A comparison of Example 2 with Control C-3 shows that Izod impact and viscosity decreases significantly when the nitrile rubber is left out of the formulation (C-3). When leaving out the segmented polyether ester (C-2), the Izod remains high and the IDI results are slightly lower than in Example 2. However, the viscosity increased to 2000 which means that processing of the formulation will require more energy than that of Example 2 where the viscosity is 1640. When comparing Example 3 with Controls C-4 and C-5, the IDI results at −20° C. clearly indicate the improved impact which is obtained with the formulations of the present invention. Control C-4 exhibits somewhat equivalent heat resistance and room temperature Izod impact to that of Example 3 but it also exhibits higher viscosity. Control C-5 exhibits better viscosity but is also marked by lower Izod impact. This improvement in low temperature impact is important in applications where the molded parts would be exposed to such low temperatures as in automobiles, housings for power tools, such as chain saws, snow blowers, snow modiles and the like.

In summary, Examples 1 and 2 have higher Izod impact, higher IDI, both at room temperature and −20° C. than the control samples (C-1 to C-5). Example 3 is formulated to have a higher heat resistance (Vicat) and exhibits improved IDI results at −20° C. when compared to Controls C-4 and C-5.

to absorb impact energy without cracking or shattering. This is important in applications such as automobile dashboards where, if struck by a body on collision, the molded polymer would tend to deform and yield to the blow but would not shatter.

TABLE 3

| SUMMARY OF EXAMPLES 2 AND 7 TO 9 | | | | |
|---|---|---|---|---|
| COMPONENT | 2 | 7 | 8 | 9 |
| SMAMM | 45 | 40 | 45 | 55 |
| ABS-1 | 29 | 38.5 | 29 | 22.5 |
| ABS-2 | 7 | — | 7 | 5.6 |
| NR-1 | 11 | 14 | 11 | 8.4 |
| TCPE | 8 | 7.5 | 8 | 8.5 |
| MAGNESIUM STEARATE WT % | — | 0.3 | 0.3 | 0.3 |
| CARBON BLACK CONC. WT % | — | 0.5 | 0.5 | 0.5 |
| VICAT °C. | 129 | 129 | 132 | 137 |
| IZOD J/m NOTCH | 347 | 401 | 341 | 298 |
| DAYTON VISCOSITY Pa.s | 1640 | 1850 | 1640 | 1390 |

Referring to Table 3, the comparison of Example 8 to Example 2 shows that the invention can be color com-

TABLE 2

| COMPONENTS | SUMMARY OF EXAMPLES 4 TO 6 AND CONTROLS C-6 to C-10 | | | | | | | |
|---|---|---|---|---|---|---|---|---|
| | C-6 | 4 | C-7 | C-8 | 5 | 6 | C-9 | C-10 |
| SMAMM | 63 | 60 | 60 | 60 | 70 | 74 | 74 | 74 |
| ABS-1 | 24 | 20 | 20 | 20 | 15 | 12 | 12 | 12 |
| ABS-2 | 13 | 5 | 5 | 5 | 3 | 3 | 3 | 3 |
| NR-1 | — | 7.5 | 15 | — | 5 | 5 | 11 | — |
| TCPE | — | 7.5 | — | 15 | 7 | 6 | — | 11 |
| VICAT °C. | 137 | 138 | 138 | 139 | 141 | 143 | 142 | 144 |
| IZOD J/m NOTCH | 87 | 228 | 217 | 114 | 130 | 81 | 92 | 46 |
| VISCOSITY | 1090 | 1380 | 1720 | 770 | 1140 | 1150 | 1430 | 750 |
| IDI AT ROOM TEMP. ENERGY | | | | | | | | |
| TO MAX. J | 1 | 9.2 | 8.1 | 8.3 | 4.5 | 2.2 | 1.3 | 0.9 |
| TO FAIL J | 1.1 | 10.1 | 8.5 | 9.3 | 4.7 | 2.2 | 1.4 | 0.9 |
| TENSILE STRENGTH | | | | | | | | |
| YIELD MPa | 37.3 | 35.2 | 31.4 | 39.3 | 41.5 | 43.7 | 38.3 | 46.0 |
| FAIL MPa | 34.4 | 29.3 | 26.1 | 33.4 | 33.7 | 38.3 | 31.5 | 45.3 |
| % ELONGATION YIELD | 2.09 | 2.48 | 2.28 | 2.42 | 2.62 | 2.44 | 2.09 | 2.4 |
| % ELONGATION FAIL | 20 | 23 | 14 | 24.3 | 13.3 | 6.7 | 9.2 | 2.8 |
| MODULUS MPa | 2406 | 1882 | 1847 | 2000 | 2096 | | 2358 | 2592 |

In Table 2, a comparison of the present invention in Example 4 and Contol C-6 shows a dramatic increase in Izod impact and IDI at room temperature over SMA-/ABS composition of the prior art with no loss in Vicat and acceptable decreases in tensile and modulus for many applications. A comparison of Example 4 with Controls C-7 and C-8 demonstrates that the compositions of the present invention have higher Izod impact and IDI while maintaining Vicat, tensile, and modulus in an acceptable range. A comparsion of Example 6 to Controls C-9 and C-10 shows a significant improvement of IDI. Control C-9 has a somewhat higher Izod impact than Example 6, however, the IDI values are significantly less. IDI values indicate the ability of a polymer pounded with 0.2% by weight carbon black without significant changes in Izod impact, Vicat, and viscosity. Polymeric compositions containing carbon black are used for such products as automotive instrument panels where a black finish is desired. The ratios of the components of Examples 7 and 8 were varied to get different properties. Compared to Examples 8, Example 7 has a very high Izod impact with an increasd viscosity, and Example 9 has a high Vicat with a lower Izod impact and a lower viscosity.

These examples further illustrate the balance of properties that can be obtained within the framework of the present invention.

TABLE 4

| SUMMARY OF EXAMPLES 1 AND 10 TO 12 | | | | |
|---|---|---|---|---|
| COMPONENTS | 1 | 10 | 11 | 12 |
| SMAMM | 45 | 45 | 45 | 45 |
| ABS-1 | 35 | 35 | 35 | 35 |
| NR-1 | 12 | 12 | | |
| NR-2 | | | 12 | 12 |
| TCPE | 8 | 8 | 8 | 8 |
| MAGNESIUM STEARATE | — | 0.3 | 0.3 | 0.3 |

TABLE 4-continued
SUMMARY OF EXAMPLES 1 AND 10 TO 12

| COMPONENTS | 1 | 10 | 11 | 12 |
|---|---|---|---|---|
| CARBON BLACK CONCENTRATE | — | 1.5 | 1.5 | 1.5 |
| SP 1045 | — | 2 | 2 | 2 |
| VICAT °C. | 131 | 131 | 132 | 134 |
| IZOD IMPACT J/M NOTCH | 347 | 317 | 311 | 276 |
| GARDNER IMPACT J | — | 12.9 | 13.6 | 12.5 |
| TENSILE STRENGTH | | | | |
| YIELD MPa | 28.6 | 25.9 | 25.9 | 23.5 |
| FAIL MPa | 24.2 | 22.9 | 23.2 | 22.5 |
| % ELONGATION | | | | |
| YIELD | 2.78 | 2.8 | 2.6 | 2.4 |
| FAIL | 23.9 | 33.6 | 31.8 | 47.9 |
| MODULUS MPa | 1470 | 1185 | 1275 | 1241 |

Referring to Table 4, in Examples 10 to 12 two nitrile rubber components were compared and a curing agent for the nitrile rubber was used. A comparison of Example 10 and Example 1 shows that the addition of a curing agent (SP 1045) and carbon black resulted in the same Vicat and lower values for Izod impact, tensile properties and modulus. Example 11 is the same as Example 10, except that a nitrile rubber with a Mooney viscosity of 80 (NR-2) was used instead of a nitrile rubber with a Mooney viscosity of 55 (NR-1). Very little difference is observed in the properties of the two polymers. Example 12 is a repeat of Example 11, except that Example 12 is compounded in an ABS extruder with a 6.35 cm screw rather than a Banbury mixer. The Vicat is slightly higher and the Izod impact is slightly lower, but the properties of the two polymers are very similar.

The amounts of the various polymeric components used in the present invention can be varied within wide limits in order to obtain the desired properties in the final molded or extruded product. In this regard the amount of the polyetherester component will be in the range of from 3 to 20% by weight. Amounts of polyetherester in the range of from 3 to 15% by weight are preferred to achieve the desired combination of Vicat, Izod impact, and IDI.

The amount of the SMA polymer component used is in the range of from 15 to 75% by weight and the amount of the ABS component used is in the range of from 12 to 60% by weight. As seen in the working examples, the amount of the SMA and ABS polymer components used will depend on the properties sought in the final product. For a balance of higher impact values and higher Vicat temperatures it is preferred to select amounts such that the weight ratio of the SMA polymer to the ABS polymer is in the range of from 20:80 to 90:10, with 35:65 to 90:10 being especially preferred when using 3 to 15% by weight of the polyetherester component and 3 to 20% nitrile rubber.

Especially good impact values can be expected when the SMA polymer component is a rubber modified SMA polymer as described above, which contains from 5 to 35%, preferably 5 to 25%, by weight of rubber component. Such rubber modified SMA polymers when used in combination with the ABS polymer can provide a high rubber content to the blend. Optionally, the rubber modified SMA can replace part or all of the ABS component.

What is claimed is:
1. A polyblend consisting essentially of:
   A. from 3 to 20% by weight of a thermoplastic copolyetherester elastomer;
   B. from, 15 to 75% by weight of a polymer of a vinyl-aromatic monomer and an unsaturated dicarboxylic acid anhydride monomer and optionally a termonomer selected from the group consisting of $C_1$ to $C_3$ acrylates and methacrylates and unsaturated nitriles, wherein the relative amounts by weight of the monomers in the polymer are 50 to 85% of the vinyl-aromatic monomer, 15 to 35% of the dicarboxylic acid anhydride and 0 to 20% of the termonomer; and wherein the monomers are polymerized in the presence of 0 to 25% by weight of a rubber having a glass transition temperature below 0° C.;
   C. from 12 to 60% by weight of a grafted polymer composition comprising a graft polymer of from 20 to 40 parts by weight of a monomer selected from the group consisting of acrylonitrile and methyl methacrylate and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 10 to 60% by weight based on the weight of the composition; and
   D. from 3 to 20% by weight of a nitrile rubber comprising a polymer of 15 to 50 parts by weight of an unsaturated nitrile monomer and 85 to 50 parts by weight of a diene monomer wherein the polymer has a Mooney viscosity in the range from 30 to 95 cps.

and wherein the weight percent for Components (A), (B), (C) and (D) is based on the total amount of Components (A), (B), (C) and (D) in the polyblend.

2. A polyblend as in claim 1 wherein the copolyetherester is in the range from 3 to 15% by weight and the weight ratio of the Component B polymer of vinyl aromatic monomer and dicarboxylic acid monomer to the Component C grafted polymer composition is in the range from 20:80 to 90:10.

3. A polyblend as in claim 1 wherein the copolyetherester is in the range from 3 to 15% by weight and the weight ratio of the component B polymer of vinyl aromatic monomer and dicarboxylic acid monomer to the Component C grafted polymer composition is in the range from 35:65 to 90:10.

4. A polyblend as in claim 1 wherein the polyetherester comprises a polytetramethylene ether terephthalate soft segment and a polybutylene terephthalate hard segment.

5. A polyblend as in claim 1 wherein Component B is a styrene/maleic anhydride polymer.

6. A polyblend as in claim 1 wherein the grafted polymer of Component C is a graft polymer of styrene and acrylonitrile onto a butadiene rubber.

7. A polyblend as in claim 1 wherein Component D is an acrylonitrile/butadiene rubber having an acrylonitrile content in the range of 15 to 50%, a Mooney viscosity in the range from 30 to 95 cps and a specific gravity in the range of 0.9 to 1.10.

8. A polyblend consisting essentially of:
   A. from 3 to 20% by weight of a thermoplastic copolyetherester elastomer comprising a polytetramethylene ether terephthalate soft segment and a polybutylene terephthalate hard segment;
   B. from 15 to 75% by weight of a styrene maleic anhydride polymer comprising 50 to 85% by weight of styrene, 15 to 35% by weight of maleic anhydride and 0 to 20% of a methyl methacrylate termonomer;
   C. from 12 to 60% by weight of a grafted polymer composition comprising a graft polymer of from 20 to 40 parts by weight of a monomer selected from the group consisting of acrylonitrile and methyl methacrylate and 80 to 60 parts by weight of styrene, the polymer being grafted onto a butadiene rubber having a glass transition temperature below 0° C. wherein the monomers are polymerized in the presence of and grafted onto the substrate rubber, wherein the weight percent of the rubber is in the range from 5 to 60% by weight based on the weight of the composition; and
   D. from 3 to 20% by weight of a nitrile rubber comprising a polymer of 15 to 50 parts by weight of acrylonitrile and 85 to 50 parts by weight of butadiene wherein the polymer has a Mooney viscosity in the range from 30 to 95 cps.
and wherein the weight ratio of the Component B styrene/maleic anhydride polymer to the Component C grafted polymer composition is in the range of 90:10 to 20:80; and wherein the weight percent for Components (A), (B), (C) and (D) is based on the total amount of Components (A), (B), (C) and (D) in the polyblend.

9. A polyblend as in claim 8 wherein the copolyetherester is in the range from 3 to 15% by weight and the weight ratio of the Component B polymer of styrene maleic anhydride polymer to the Component C grafted polymer composition is in the range from 35:65 to 90:10.

10. A polyblend as in claim 8 wherein the Component B styrene maleic anhydride polymer contains 5 to 15% by weight of a methyl methacrylate termonomer and wherein the grafted polymer of Component C is a graft polymer of styrene and acrylonitrile onto a butadiene rubber.

11. A polyblend as in claim 1 wherein: Component (A) is a copolyether ester which comprises a polytetramethylene ether terephthalate soft segment and a polybutylene terephthalate hard segment; Component (B) is a styrene/maleic anhydride/methyl methacrylate polymer; Component (C) is a graft polymer of styrene and acrylonitrile onto a butadiene rubber; and Component (D) is an acrylonitrile/ butadiene rubber.

12. A polyblend as in claim 8 wherein the polymer of the vinyl aromatic monomer and the unsaturated dicarboxylic acid anhydride of Component B is prepared by polymerizing the monomers in the presence of rubber component having a glass transition temperature below 0° C. to provide from 10 to 25% by weight of rubber in the polymer.

13. Molded and extruded articles prepared from a polyblend consisting essentially of:
   A. from 3 to 20% by weight of a thermoplastic copolyetherester elastomer;
   B. from 15 to 75% by weight of a polymer of a vinyl-aromatic monomer and an unsaturated dicarboxylic acid anhydride monomer and optionally a termonomer selected from the group consisting of $C_1$ to $C_3$ acrylates and methacrylates and unsaturated nitriles, wherein the relative amounts by weight of the monomers in the polymer are 50 to 85% of the vinyl aromatic monomer, 15 to 35% of the dicarboxylic acid anhydride and 0 to 20% of the termonomer; and wherein the monomers are polymerized in the presence of 0 to 25% by weight of a rubber having a glass transition temperature below 0° C.;
   C. from 12 to 60% by weight of a grafted polymer composition comprising a graft polymer of from 20 to 40 parts by weight of a monomer selected from the group consisting of acrylonitrile and acrylonitrile and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition; and
   D. from 3 to 20% by weight of a polymer composition comprising a polymer of 18 to 40 parts by weight of an unsaturated nitrile and 22 to 60 parts by weight of a diene wherein the polymer has a Mooney viscosity in the range from 30 to 95 cps.
and wherein the weight percent for Components (A), (B), (C) and (D) is based on the total amount of Components (A), (B), (C) and (D) in the polyblend.

14. A polyblend consisting essentially of:
   A. from 3 to 20% by weight of a thermoplastic copolyetherester elastomer;
   B. from 15 to 75% by weight of a polymer of a styrene-maleic anhydride polymer comprising 50 to 85% by weight of styrene, 5 to 35% by weight of maleic anhydride and 0 to 20% of a termonomer selected from the group consisting of $C_1$ to $C_3$ acrylates and methacrylates and unsaturated nitriles;
   C. from 12 to 60% by weight of a grafted polymer composition comprising a rubber-modified polymer of a vinyl aromatic monomer, an unsaturated dicarboxylic acid anhydride and optionally a termonomer selected from the group consisting of $C_1$ to $C_3$ acrylates and methacrylates and unsaturated nitriles; wherein the monomers are polymerized in the presence of 5 to 35% by weight of a rubber having a glass transition temperature below 0° C.; and
   D. from 3 to 20% by weight of a nitrile rubber comprising a polymer of 15 to 50 parts by weight of acrylonitrile and 85 to 50 parts by weight of butadiene wherein the polymer has a monomer viscosity in the range from 30 to 95 cps.
and wherein the weight ratio of the component B styrene-maleic anhydride polymer to component C grafted polymer composition is in the range of 90:10 to 20:80; and wherein the weight percent for Components (A), (B), (C) and (D) is based on the total amount of components (A), (B), (C) and (D) in the polyblend.

15. A polyblend as in claim 14 wherein Component C is a rubber-modified polymer of styrene, maleic anhydride and, optionally, methyl methacrylate.

* * * * *

UNITED STATES PATENT AND TRADEMARK OFFICE
CERTIFICATE OF CORRECTION

PATENT NO. : 4,460,741
DATED : Jul. 17, 1984
INVENTOR(S) : Daniel L. Dufour; James S. Holtrop It is certified that error appears in the above-identified patent and that said Letters Patent are hereby corrected as shown below:

Column 5, line 2 change "79butadiene" to --79% butadiene--
Column 5, line 19 change "york" to --York--
Column 7, line 17 change "modiles" to --mobiles--

Signed and Sealed this

Twelfth Day of March 1985

[SEAL]

Attest:

DONALD J. QUIGG

Attesting Officer     Acting Commissioner of Patents and Trademarks